US012188475B2

(12) United States Patent
Schmid et al.

(10) Patent No.: US 12,188,475 B2

(45) Date of Patent: Jan. 7, 2025

(54) CENTRIFUGAL PUMP AND A PUMP HOUSING

(71) Applicant: Levitronix GmbH, Zurich (CH)

(72) Inventors: Alexander Schmid, Hausen am Albis (CH); Marcel Stettler, Lenzburg (CH)

(73) Assignee: LEVITRONIX GMBH, Zurich (CH)

( * ) Notice: Subject to any disclaimer, the term of this patent is extended or adjusted under 35 U.S.C. 154(b) by 50 days.

(21) Appl. No.: 17/000,458

(22) Filed: Aug. 24, 2020

(65) Prior Publication Data

US 2021/0079922 A1 Mar. 18, 2021

(30) Foreign Application Priority Data

Sep. 18, 2019 (EP) .................................... 19198087

(51) Int. Cl.
*F04D 17/16* (2006.01)
*F04D 1/00* (2006.01)
(Continued)

(52) U.S. Cl.
CPC ............ *F04D 17/161* (2013.01); *F04D 1/00* (2013.01); *F04D 13/024* (2013.01);
(Continued)

(58) Field of Classification Search
CPC ........ F04D 1/00; F04D 13/024; F04D 13/026; F04D 13/06; F04D 17/161; F04D 17/16;
(Continued)

(56) References Cited

U.S. PATENT DOCUMENTS 4,183,288 A * 1/1980 Miyao ..................... F01B 13/06 91/488
4,822,181 A * 4/1989 Egli .................... F16C 32/0659 384/12

(Continued)

FOREIGN PATENT DOCUMENTS

CN 1697602 A 11/2005
CN 1918434 A 2/2007

(Continued)

OTHER PUBLICATIONS

MAchine Translation of TW 512886.*

(Continued)

*Primary Examiner* — Christopher S Bobish
(74) *Attorney, Agent, or Firm* — Global IP Counselors, LLP

(57) ABSTRACT

A centrifugal pump for conveying a fluid, includes a pump housing, a rotor configured to convey the fluid disposed within the housing; and a stator which, together with the rotor, forms an electromagnetic rotary drive configured to rotate the rotor about an axial direction. The stator is a bearing and drive stator with which the rotor capable of being magnetically driven without contact and magnetically levitated without contact with respect to the stator. The rotor is passively magnetically levitated in the axial direction, and actively magnetically levitated in a radial plane perpendicular to the axial direction. The pump housing includes comprising a bottom and a cover, and the rotor is arranged in the pump housing between the bottom and the cover with respect to the axial direction. An indentation is disposed in the bottom or in the cover, the indentation being configured to generate a local turbulence.

15 Claims, 6 Drawing Sheets

(51) Int. Cl.

| | |
|---|---|
| ***F04D 13/02*** | (2006.01) |
| ***F04D 13/06*** | (2006.01) |
| ***F04D 25/02*** | (2006.01) |
| ***F04D 29/048*** | (2006.01) |
| ***F04D 29/18*** | (2006.01) |
| ***F04D 29/22*** | (2006.01) |
| ***F04D 29/42*** | (2006.01) |

(52) U.S. Cl.
CPC ........... *F04D 13/026* (2013.01); *F04D 13/06* (2013.01); *F04D 17/16* (2013.01); *F04D 25/026* (2013.01); *F04D 29/048* (2013.01); *F04D 29/186* (2013.01); *F04D 29/2266* (2013.01); *F04D 29/4206* (2013.01); *F05D 2240/30* (2013.01); *F05D 2240/515* (2013.01); *F05D 2300/43* (2013.01)

(58) Field of Classification Search
CPC .... F04D 25/026; F04D 29/048; F04D 29/186; F04D 29/2266; F04D 29/4206
See application file for complete search history.

(56) References Cited

U.S. PATENT DOCUMENTS

| | | | | |
|---|---|---|---|---|
| 5,449,236 | A * | 9/1995 | Hori | F16C 32/0659 384/118 |
| 6,056,441 | A * | 5/2000 | Scharrer | F16C 32/0685 384/114 |
| 6,171,078 | B1 * | 1/2001 | Schob | A61M 60/824 417/423.1 |
| 6,227,797 | B1 * | 5/2001 | Watterson | A61M 60/178 415/107 |
| 6,318,896 | B1 * | 11/2001 | Meng | F16C 32/0659 384/114 |
| 7,112,903 | B1 * | 9/2006 | Schob | F16C 32/0465 310/90.5 |
| 7,241,051 | B2 * | 7/2007 | Grantz | F16C 17/107 384/107 |
| 7,225,154 | B2 | 8/2007 | Koga et al. | |
| 7,517,185 | B2 | 4/2009 | Hirakawa et al. | |
| 8,226,373 | B2 * | 7/2012 | Yaegashi | F04D 29/048 417/44.11 |
| 8,430,652 | B2 * | 4/2013 | Yaegashi | A61M 60/232 417/423.12 |
| 8,579,607 | B2 * | 11/2013 | Wampler | F04D 29/0473 417/423.12 |
| 9,115,725 | B2 * | 8/2015 | Haefliger | F04D 13/0633 |
| 9,410,549 | B2 * | 8/2016 | Ozaki | F04D 25/026 |
| 9,422,974 | B2 * | 8/2016 | Saito | F16C 32/0659 |
| 9,592,326 | B2 * | 3/2017 | Takatani | A61M 60/196 |
| 10,001,129 | B2 * | 6/2018 | Steinseifer | A61M 60/178 |
| 10,473,159 | B2 * | 11/2019 | Deshpande | F16C 32/0644 |
| 2003/0031560 | A1 | 2/2003 | Blattmann | |
| 2010/0028176 | A1 * | 2/2010 | Platt | F04D 13/027 415/10 |
| 2011/0002794 | A1 * | 1/2011 | Haefliger | F04D 29/0413 415/203 |
| 2013/0022481 | A1 * | 1/2013 | Schob | F04D 29/048 310/156.01 |
| 2019/0055946 | A1 * | 2/2019 | Luxford | B01D 35/26 |

FOREIGN PATENT DOCUMENTS

| | | | |
|---|---|---|---|
| CN | 101501962 | A | 8/2009 |
| CN | 103023265 | A | 4/2013 |
| EP | 3232549 | A1 | 10/2017 |
| JP | 2004347291 | A | 12/2004 |
| JP | 2006057487 | A | 3/2006 |
| JP | 2016188590 | A | 11/2016 |
| RU | 2196253 | C1 | 1/2003 |
| TW | 200928099 | A | 7/2009 |
| TW | M512886 | U | 11/2015 |
| WO | 9631934 | A1 | 10/1996 |
| WO | 9811650 | A1 | 3/1998 |
| WO | 2011118325 | A1 | 9/2011 |
| WO | 2012/159966 | A1 | 11/2012 |

OTHER PUBLICATIONS

Extended European Search Report issued Mar. 2, 2020 in corresponding European Patent Application No. 19198087.9 filed Sep. 18, 2019.

European Office Action issued Oct. 27, 2022 in corresponding European Patent Application No. 20190815.9.

Chinese Office Action and Search Report issued Apr. 12, 2023 in corresponding Chinese Application No. 202010831021.3.

Taiwanese Search Report issued Mar. 18, 2024 in corresponding Taiwanese Application No. 109128413 (Google machine translation).

Taiwanese Office Action issued Mar. 18, 2024 in corresponding Taiwanese Application No. 109128413 (Google machine translation).

Japanese Office Action issued May 28, 2024 in corresponding Japanese Application No. 2020-144046.

* cited by examiner

CENTRIFUGAL PUMP AND A PUMP HOUSING

CROSS-REFERENCE TO RELATED APPLICATION

This application claims priority to European Patent Application No. 19198087.9, filed Sep. 18, 2019, the contents of which are hereby incorporated herein by reference in their entirety.

BACKGROUND

Field of the Invention

The present invention relates to a centrifugal pump for conveying a fluid and to a pump housing.

Background Information

Conventional centrifugal pumps can comprise an electromagnetic rotary drive, which is designed and operated according to the principle of a bearingless motor. In this respect, the term bearingless motor means an electromagnetic rotary drive in which the rotor is levitated completely magnetically with respect to the stator, wherein no separate magnetic bearings are provided. For this purpose, the stator is designed as a bearing and drive stator, which is both the stator of the electric drive and the stator of the magnetic levitation. By the electrical windings of the stator, a magnetic rotating field can be generated which, on the one hand, exerts a torque onto the rotor, which effects its rotation and which, on the other hand, exerts a shear force, which can be set as desired, onto the rotor so that its radial position can be actively controlled or regulated. Thus, three degrees of freedom of the rotor can be actively regulated, namely its rotation and its radial position (two degrees of freedom). With respect to three further degrees of freedom, namely its position in the axial direction and tilts with respect to the radial plane perpendicular to the desired axis of rotation (two degrees of freedom), the rotor is passively magnetically levitated or stabilized by reluctance forces, i.e. it cannot be controlled. The absence of a separate magnetic bearing with a complete magnetic levitation of the rotor is the property, which gives the bearingless motor its name.

The bearingless motor has become sufficiently well known to the person skilled in the art in the meantime and is used for a number of different applications. Some fundamental descriptions can be found, for example, in EP A 0 860 046 and EP-A-0 819 330.

Centrifugal pumps which are designed according to the principle of the bearingless motor have proven themselves in a wide range of applications.

Due to the absence of mechanical bearings, a centrifugal pump with a bearingless motor is in particular suitable for such applications in which very sensitive substances are conveyed, for example blood pumps, or on which very high demands are made on purity, for example in the pharmaceutical industry or in the biotechnological industry, or with which abrasive or aggressive substances are conveyed, which would very quickly destroy mechanical bearings, for example pumps for slurry or acidic fluids in the semiconductor industry.

A further advantage of the principle of the bearingless motor results from the design of the rotor as an integral rotor, which is both the rotor of the electromagnetic drive and the rotor of the centrifugal pump. In addition to the contactless magnetic levitation, the advantage results here of a very compact and space-saving configuration.

In addition, the principle of the bearingless motor also allows designs of centrifugal pumps in which the rotor or the pump housing with the rotor arranged therein can be very easily separated from the stator. This is a very big advantage since the pump housing can thus be designed as a single-use part for single use, for example. Such single-use applications today frequently replace processes in which all those components, which come into contact with the fluids to be treated in the process previously had to be cleaned and sterilized in a complex manner, for example by steam sterilization, due to the very high purity demands. In the design for single use, those components which come into contact with the fluids to be treated are only used exactly once and are then replaced with new, i.e. unused, single-use parts in the next application.

SUMMARY

In all these applications where the bearingless motor is successfully used in centrifugal pumps, it is in principle possible to design the bearingless motor as an internal rotor, i.e. with an internally arranged rotor and a stator arranged around it, or as an external rotor, i.e. with an internally arranged stator and a rotor arranged around it. However, it has been found that with both designs for some applications the passive magnetic stabilization of the rotor has limitations with respect to displacement in the axial direction and also tilting in relation to the radial plane or may even be insufficient to guarantee a safe and trouble-free operation of the centrifugal pump.

It is therefore an object of the present invention to provide a centrifugal pump with an electromagnetic rotary drive comprising a rotor, which can be magnetically driven without contact and magnetically levitated without contact, wherein the passive magnetic stabilization of the rotor is improved, in particular with regard to displacements in the axial direction. In addition, it is an object of the invention to propose a pump housing for such a centrifugal pump.

The objects of the invention meeting this problem are characterized by the features described herein.

According to an embodiment of the invention, a centrifugal pump for conveying a fluid is thus proposed, having a pump housing in which a rotor is provided for conveying the fluid, and having a stator which, together with the rotor forms an electromagnetic rotary drive for rotating the rotor about an axial direction, wherein the stator is designed as a bearing and drive stator with which the rotor can be magnetically driven without contact and magnetically levitated without contact with respect to the stator, wherein the rotor is passively magnetically levitated in the axial direction, and is actively magnetically levitated in a radial plane perpendicular to the axial direction, wherein the pump housing comprises a bottom and a cover, wherein the rotor is arranged in the pump housing between the bottom and the cover with respect to the axial direction, and wherein at least one indentation is provided in the bottom and/or in the cover, which indentation is designed to generate a local turbulence.

This embodiment of the invention is based on the finding that by the at least one indentation in the pump housing the flow conditions in the pump housing can be influenced in such a way that in particular the forces acting on the rotor in the axial direction can be reduced. Due to this reduction, the magnetic axial levitation of the rotor is relieved, resulting in a significant improvement in the passive magnetic stabilization of the rotor. It has also been shown that the passive magnetic stabilization can significantly improve the prevention of tilting of the rotor to a radial plane, which is perpendicular to the axial direction, by the at least one indentation. By generating local turbulences, the flow behavior around the rotor is thus changed in a targeted manner, so that the forces acting on the rotor and in particular the forces acting in the axial direction are reduced.

In principle, neither geometric barriers to reduce the backflow from the pressure side to the suction side or to reduce the speed of this backflow, nor relief bores which extend completely through the rotor in the axial direction for pressure compensation are necessary for the invention. The at least one indentation leads to a local turbulence and/or flow separation, which reduces the force of the flow on the surface of the rotor surrounded by the flow. By a reduction of the dynamic lift, which results for example from the flow separation caused by the indentation, the force acting on the rotor is also reduced.

According to a preferred embodiment, the rotor comprises an annular or disk-shaped magnetically effective core, and an impeller having a plurality of vanes for conveying the fluid. In this respect, the magnetic core interacts with the stator to drive and to levitate the rotor without contact, while the impeller with the vanes conveys the fluid.

Preferably, the centrifugal pump is designed with a radial impeller. An inlet for the fluid is provided on the cover of the pump housing, which is designed in such a way that the fluid can flow into the pump housing in the axial direction. Furthermore, the pump housing comprises an outlet for the fluid, which is designed in such a way that the fluid can flow out of the pump housing in a radial direction. This means that the impeller is subject to an axial flow and conveys the fluid in a direction perpendicular to it. In other embodiments, the impeller can also be designed as a semi-axial impeller.

Furthermore, it is preferred that the rotary drive of the centrifugal pump is designed according to the principle of an internal rotor. For this purpose, the stator has for example a plurality of stator poles which are arranged annularly, and the pump housing with the rotor arranged therein is designed in such a way that it can be inserted into the stator between the stator poles in such a way that the magnetically effective core of the rotor is surrounded by the stator poles.

In practice, it has been shown to be advantageous for the rotor to have an outer diameter, and for each indentation to have an extension with respect to the radial direction which is at least one fiftieth of the outer diameter of the rotor.

Furthermore, it is advantageous if the rotor has an outer diameter and each indentation has an extension with respect to the radial direction which is at most half the outer diameter of the rotor.

It is a further preferred measure that the rotor has an outer diameter, and each indentation has a depth with respect to the axial direction which is at least one hundred fiftieth, preferably at least one hundredth of the outer diameter of the rotor.

It is also preferred that the rotor has an outer diameter, and each indentation has a depth with respect to the axial direction which is at most one tenth of the outer diameter of the rotor.

The desired reduction of the forces and tilting moments acting on the rotor can be influenced by several factors which can be optimized for the respective application. These factors comprise in particular the number of indentations, the position of the indentations and the geometrical dimensions of the indentations, i.e. in particular their extension in the radial direction and their extension in the axial direction.

If several indentations are disposed on the cover and/or the bottom, it is of course not necessary that all indentations have to have the same dimensions. It is also quite possible that the indentations have different dimensions and/or geometries.

The specific shape of the indentation has less influence. The indentations can, for example, be designed with a square profile or with a rectangular profile. The indentations can be designed pyramid-shaped, cone-shaped, truncated cone-shaped, annular or even with a free-form geometry. The indentation or indentations should only be designed such that the local surface texture is modified in such a way that the flow of the fluid is swirled at this point.

For manufacturing reasons, however, it is preferred that each indentation has a circular profile perpendicular to the axial direction. For this purpose, for example, each indentation is designed as a blind hole whose diameter determines the extension of the indentation in the radial direction and whose length determines the depth of the indentation in the axial direction.

According to a preferred embodiment, at least one indentation is disposed in both the cover and the bottom of the pump housing.

A further preferred measure is that each indentation is arranged in a radially outer edge region of the pump housing. This means in particular that each indentation in the cover of the pump housing is closer to the radially outer edge of the cover than to the center of the cover, and that each indentation in the bottom of the pump housing is closer to the radially outer edge of the bottom than to the center of the bottom.

Preferably, the pump housing is made of a plastic or a metallic material.

It is also preferred that the impeller is made of a plastic or a metallic material.

A further advantageous measure is that the rotor has a jacket which completely encloses the magnetically effective core of the rotor, so that the magnetically effective core does not come into contact with the fluid. The jacket is preferably made of a plastic but can also be made of a metallic material.

The pump housing, the impeller and the jacket can be made of the same plastic or metallic material or of different plastics or metallic materials. Of course, combinations of plastics or metallic materials are also possible, for example, the jacket of the rotor can be made of a plastic and the pump housing of a metallic material.

In order to further relieve the passive magnetic stabilization or levitation of the rotor with respect to three degrees of freedom (displacements in axial direction, tilts with respect to the radial plane) and thus to further improve the stabilization of the rotor with respect to these three degrees of freedom, further measures are possible, which are not exhaustively listed.

The rotor can have a cover plate which covers the vanes of the impeller on their side facing the inlet, wherein a centrally arranged opening is disposed in the cover plate, through which the fluid can flow to the impeller.

The magnetically effective core of the rotor can have a central bore that extends in the axial direction completely through the magnetically effective core and the optional jacket.

The rotor can comprise one balancing hole or a plurality of balancing holes, wherein each balancing hole extends in the axial direction completely through the magnetically effective core of the rotor and the optional jacket. Each balancing hole is preferably arranged decentral, i.e. not at the center of the rotor.

If a plurality of balancing holes is provided, the balancing holes are preferably arranged on a circular line around the central bore or around the center of the rotor. Preferably, at most or exactly eight balancing holes are provided, which are preferably arranged equidistant around the central bore of the rotor or around the center of the rotor.

Preferably, each balancing hole has a diameter that is smaller than the diameter of the central bore.

A plurality of rear vanes can be provided on the axial end face of the rotor facing away from the inlet. In the operating state, these rear vanes are opposite the bottom of the pump housing.

The rear vanes can be realized, for example, by providing recesses in the jacket of the rotor, so that the rear vanes are each formed between two adjacent recesses.

Furthermore, it is possible to design the rear vanes as elevations. For this purpose, for example, a structure similar to an impeller can be generated, which is then attached to the axial end face of the rotor so that the rear vanes are opposite the bottom of the pump housing. Of course, the rear vanes can also be manufactured individually and then attached to the axial end face of the rotor.

Preferably, each rear vane extends in the radial direction. Preferably, each rear vane starts at the radial outer edge of the axial end face of the rotor and extends from there radially inwards. Each rear vane can extend to the center of the axial end face or up to the central bore or each rear vane has a length in the radial direction, which is smaller than the radius of the axial end face, for example half as large.

Preferably, the outlet is designed as an outlet connection. The outlet connection preferably extends perpendicular to the axial direction. The outlet connection preferably has an inlet surface through which the fluid enters the outlet connection and an outlet surface through which the fluid leaves the outlet connection. Preferably, the inlet surface is smaller than the outlet surface.

Preferably, the outlet connection is designed cylindrical in its outer shape. With the cylindrical design it is preferred that the outlet connection has a central axis and that the outlet connection is arranged with respect to the axial direction such that the central axis is closer to the magnetically effective core of the rotor than to the cover of the pump housing.

It is also possible to design the inlet of the pump housing as an inlet connection, which preferably extends in the axial direction. The inlet connection preferably has an inlet surface through which the fluid enters the inlet connection and an outlet surface through which the fluid leaves the inlet connection and flows towards the impeller. Preferably, the inlet surface is larger than the outlet surface. Furthermore, it is preferred if the inlet connection has a constriction area in which the flow cross-section perpendicular to the axial direction is smaller than the inlet surface and smaller than the outlet surface.

Another advantageous measure is that an annular or circular disk-shaped pressure plate is provided on the impeller, which is aligned perpendicular to the axial direction. The pressure plate is arranged between the magnetically effective core and the end of the impeller facing the cover of the pump housing with respect to the axial direction so that it extends between the vanes of the impeller. If the rotor has a cover plate, the pressure plate is arranged between the magnetically effective core and the cover plate with respect to the axial direction. The pressure plate extends between all vanes.

With respect to the radial direction, the pressure plate is arranged centered with respect to the rotor and preferably extends in the radial direction at most to the radially outer end of the vanes. However, the pressure plate can also be designed with respect to the radial direction such that its diameter is significantly smaller than the diameter of the impeller.

If the rotor has a balancing hole or a plurality of balancing holes, the pressure plate is preferably dimensioned in the radial direction such that it covers at least all balancing holes.

For the passive magnetic stabilization of the rotor, it is particularly advantageous if the diameter of the magnetically effective core of the rotor is greater than 2.6 times the height of the magnetically effective core of the rotor, the height being the extension in the axial direction. Thus, if d is the diameter of the magnetically effective core of the rotor and HR is the height of the magnetically effective core in axial direction, it is advantageous if the condition $d>2.6*HR$ is fulfilled.

The measures listed above can, for example, be provided individually in each case, or several measures can be combined, for example all measures can be combined.

Furthermore, a pump housing is proposed, in which a rotor conveys a fluid, wherein the pump housing is designed for a centrifugal pump.

The pump housing according to embodiments of the invention can in particular also be designed as a single-use part for single use. The stator of the centrifugal pump according to the invention is preferably designed as a reusable device for multiple use.

Further advantageous measures and embodiments of the invention result from the dependent claims.

BRIEF DESCRIPTION OF THE DRAWINGS

The invention will be explained in more detail hereinafter with reference to the drawings.

DETAILED DESCRIPTION OF THE EMBODIMENTS

Figure 1:
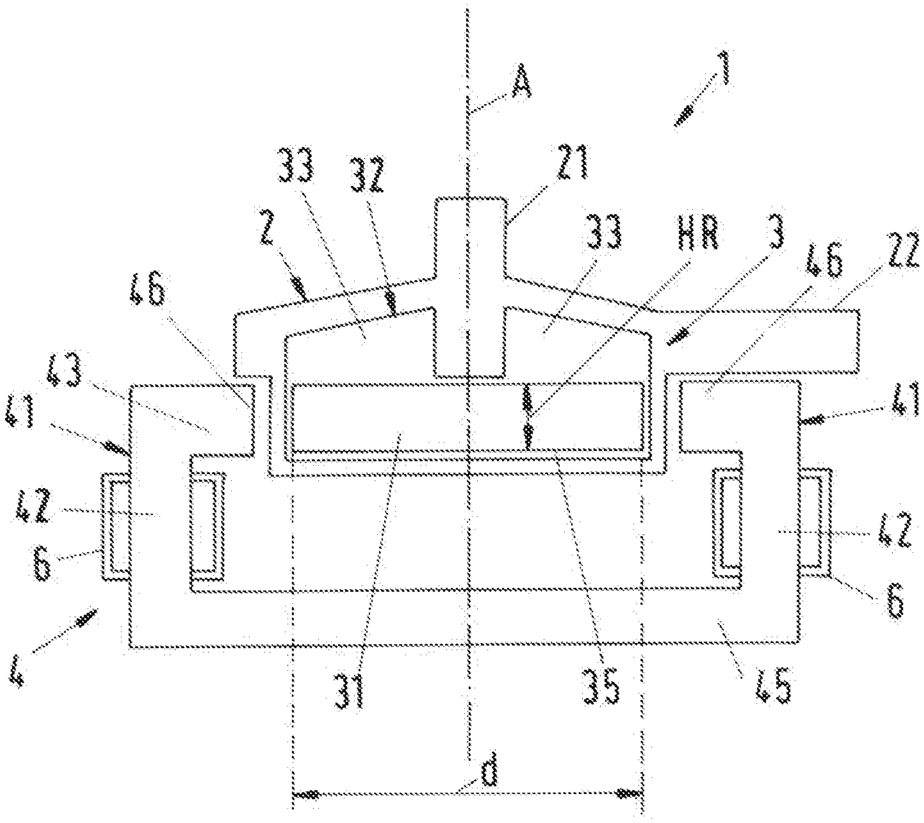
FIG. 1 is a schematic sectional view of an embodiment of a centrifugal pump comprising an electromagnetic rotary drive, which is designed as a bearingless motor.

At first, with reference to the sectional view in FIG. 1, an embodiment of a centrifugal pump is explained, which comprises an electromagnetic rotary drive which is designed as a bearingless motor. Of course, this embodiment can be designed according to the invention.

The centrifugal pump is indicated as a whole with the reference sign 1. The centrifugal pump 1 for conveying a fluid comprises a pump housing 2 with an inlet 21 and an outlet 22 for the fluid to be conveyed. A rotor 3 is arranged in the pump housing 2, which, together with a stator 4 arranged outside the pump housing 2, forms an electromagnetic rotary drive with which the rotor 3 can be driven to rotate about an axial direction A.

The electromagnetic rotary drive is designed as an internal rotor, i.e. the rotor 3 is arranged inside the stator 4, so that the stator 4 surrounds the rotor 3. The rotor 3 is magnetically levitated without contact with respect to the stator 4. Furthermore, the rotor 3 can be magnetically driven without contact to rotate around a desired axis of rotation by the stator 4. The desired axis of rotation is that axis around which the rotor 3 rotates in the operating state, when the rotor 3 is in a centered and non-tilted position with respect to the stator 4. This desired axis of rotation defines an axial direction A. Usually, the desired axis of rotation defining the axial direction A coincides with the central axis of the stator 4.

In the following, a radial direction is referred to as a direction that is perpendicular to the axial direction A.

The rotor 3 comprises a magnetically effective core 31, which is designed in the form of a circular disk, or a circular cylinder, or annular. The "magnetically effective core 31" refers to that region of the rotor 3 which interacts with the stator 4 for torque generation and the generation of magnetic bearing forces. Depending on the design, the magnetically effective core 31 can comprise one or a plurality of permanent magnets. Alternatively, it is also possible to design the magnetically effective core 31 without permanent magnets, for example as a reluctance rotor. The magnetically effective core 31 includes, at least partially, a ferromagnetic material, for example iron.

The magnetically effective core 31 preferably includes a jacket 35, which completely encapsulates the magnetically effective core 31, so that the magnetically effective core 31 does not contact the fluid to be conveyed. The jacket 35 is preferably made of a plastic but can also be made of a metallic material.

The rotor 3 further comprises an impeller 32 having a plurality of vanes 33 for conveying the fluid from the inlet 21 to the outlet 22. The impeller 32 is arranged on the jacket 35. The impeller 32 with the vanes 33 is preferably made of plastic and can, for example, be designed in one piece with the jacket 35. Of course, it is also possible to manufacture the individual vanes 33 or the entirety of vanes 33 in a separate production process and then connect them to the jacket 35, for example by a welding process. Of course, it is also possible to manufacture the impeller from a metallic material.

The impeller 32 is preferably designed as a radial impeller, which gets a flow of fluid in the axial direction A and then deflects the fluid in a radial direction.

The rotary drive with the stator 4 and the rotor 3 is designed, for example, as a so-called temple motor.

The characteristic feature of a design as a temple motor is that the stator 4 comprises a plurality of separate coil cores 41—for example six coil cores 41—each of which comprises a bar-shaped longitudinal leg 42, which extends from a first end in the axial direction A to a second end, wherein all first ends—these are the lower ends according to the representation in FIG. 1—are connected to each other by a reflux 45. Each coil core 41 further comprises a transverse leg 43, which is arranged on the second end of the respective longitudinal leg 42, and which extends in the radial direction, i.e. perpendicular to the axial direction A and thus perpendicular to the respective longitudinal leg 42. Each transverse leg 43 extends to the radial direction towards inside, i.e. towards the rotor 3. Thus, each coil core 41 has an L-shaped design, wherein the longitudinal legs 42 each form the long leg of the L extending in the axial direction A, and the transverse legs 43 extending perpendicular to the longitudinal legs 42 in the radial direction towards the rotor 3 each form the short leg of the L.

The radially inward ends of the transverse legs 43 each form a stator pole 46. The stator poles 46 are arranged annularly around the pump housing 2 with the rotor 3 arranged therein. The pump housing 2 is designed in such a way that it can be inserted into the stator 4, more precisely between the stator poles 46, so that the stator poles 46 surround the magnetically effective core 31 of the rotor 3. In the operating state, the stator poles 46 and the magnetically effective core 31 of the rotor 3 are located at the same level with respect to the axial direction A, if the rotor 3 is not deflected from its desired position. In the operating state, the rotor 3 is thus magnetically levitated without contact between the stator poles 46.

The reflux 45 and the coil cores 41 are each made of a soft magnetic material because they serve as flux guiding elements for guiding the magnetic flux. Suitable soft magnetic materials are, for example, ferromagnetic or ferrimagnetic materials, i.e. in particular iron, nickel-iron or silicon-iron.

The parallel longitudinal legs 42 of the coil cores 41, which all extend parallel to the axial direction A, and which surround the rotor 3, are the ones that gave the temple motor its name, because these parallel longitudinal legs 41 resemble the columns of a temple.

The stator 4 further comprises a plurality of windings 6 for generating electromagnetic rotating fields, with which the rotor 3 can be magnetically driven without contact and can be magnetically levitated without contact with respect to the stator 4. The windings 6 are designed for example as six individual coils, wherein one coil is provided at each of the longitudinal leg 42 in each case. Each coil is arranged around the respective longitudinal leg 42, so that the coil axis is parallel to the axial direction A in each case. For example, each longitudinal leg 42 supports exactly one coil 61. Of course, such embodiments are also possible in which each longitudinal leg 42 supports more than one coil.

That plane, where the rotor 3 is levitated in the operating state, is also called the radial plane. The radial plane defines the x-y-plane of a Cartesian coordinate system whose z-axis extends in the axial direction A.

In a preferred embodiment, the electromagnetic rotary drive designed as a temple motor is designed according to the principle of a bearingless motor. This means that during the operation of the centrifugal pump 1, the magnetically effective core 31 of the rotor 3 interacts with the stator poles 46 of the stator 4 according to the principle of the bearingless motor described above, in which the rotor 3 can be magnetically driven without contact and magnetically levitated without contact with respect to the stator 4.

The principle of the bearingless motor has become sufficiently well known to the person skilled in the art in the meantime, so that a detailed description of the function is no longer necessary. The principle of the bearingless motor means that the rotor 3 is magnetically levitated, wherein the stator 4 is designed as a bearing and drive stator, which is both the stator of the electric drive and the stator of the magnetic levitation. For this purpose, the stator 4 comprises the windings 6 with which both the drive function and the levitation function is realized. An electromagnetic rotating field can be generated by the windings 6, which on the one hand exerts a torque on the magnetically effective core 31 of the rotor 3, which causes its rotation about the axial direction A, and which on the other hand exerts an arbitrarily settable shear force on the magnetically effective core 31 of the rotor 3, so that its radial position—i.e. its position in the radial plane—can be actively controlled or regulated. In the case of a bearingless motor, in contrast to classical magnetic bearings, the magnetic levitation and the drive of the motor is realized by electromagnetic rotating fields, which exert a torque and a sellable shear force on the magnetically effective core 31 of the rotor 3. The rotating fields required for this can either be generated with different coils, or the rotating fields can be generated by mathematical superposition of the required fluxes and then with the aid of a single coil system, in this case the windings 6. In the case of a bearingless motor, it is therefore not possible to divide the electromagnetic flux generated by the windings 6 of the stator 2 into an electromagnetic flux, which only provides the drive of the rotor 3 and an electromagnetic flux which only realizes the magnetic levitation of the rotor 3.

According to the principle of the bearingless motor, at least three degrees of freedom of the rotor 3 can be actively regulated, namely its position in the radial plane and its rotation about the axial direction A. With respect to its axial deflection in the axial direction A, the magnetically effective core 31 of the rotor 3 is passively magnetically stabilized by reluctance forces, i.e. it cannot be controlled. With respect to the remaining two degrees of freedom, namely tilting with respect to the radial plane perpendicular to the desired axis of rotation, the magnetically effective core 31 of the rotor 3 is also passively magnetically stabilized. This means that the rotor 3 is passively magnetically levitated or passively magnetically stabilized by the interaction of the magnetically effective core 31 with the stator poles 46 in the axial direction A and against tilting (three degrees of freedom in total) and actively magnetically levitated in the radial plane (two degrees of freedom).

As is common practice, within the framework of this invention, an active magnetic levitation refers to one that can be actively controlled or regulated, for example by the electromagnetic rotating fields generated by the windings 6. A passive magnetic levitation or a passive magnetic stabilization is one that cannot be controlled or regulated. The passive magnetic levitation or stabilization is based, for example, on reluctance forces which bring the rotor 3 back into its equilibrium position when it is deflected from its equilibrium position, e.g. when it is displaced in the axial direction A or when it is tilted.

The magnetically effective core 31 of the rotor 3 has a diameter d, wherein the diameter d means the outer diameter of the magnetically effective core 31. The magnetically effective core 31 further has a height HR, wherein the height HR is the extension in the axial direction A. It is particularly advantageous for the passive magnetic stabilization of the rotor 3, if the diameter d of the magnetically effective core 31 of the rotor 3 is greater than 2.6 times the height HR of the magnetically effective core 31 of the rotor 3, i.e. if the geometric condition $d>2.6*HR$ is fulfilled.

Figure 2:
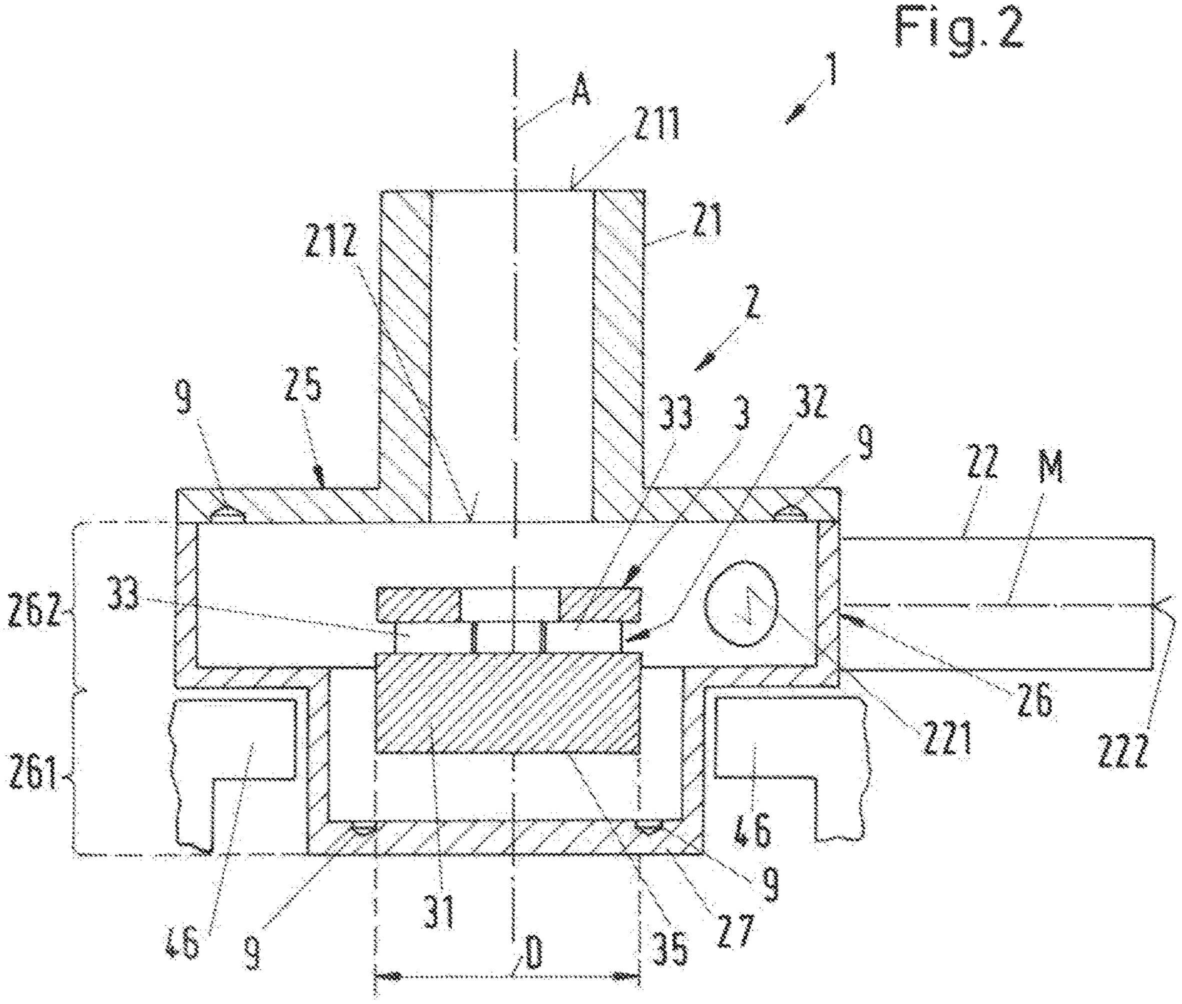
FIG. 2 is a schematic sectional view of a first embodiment of a centrifugal pump according to the invention.

FIG. 2 shows in a schematic sectional view an embodiment of a centrifugal pump 1 according to the invention, which is designed according to the embodiment explained with reference to FIG. 1. As it is sufficient for the understanding, in FIG. 2 the stator 4 is only indicated by the stator poles 46. The stator 4 and the rotor 3 are again designed in such a way that they interact according to the principle of the bearingless motor, as explained in connection with FIG. 1.

The pump housing 2 comprises a housing part 26 and a cover 25, wherein the cover 25 is arranged on the housing part 26 to close the pump housing 2. The housing part 26 and the cover 25 preferably include a plastic and are firmly and sealingly connected to each other, for example welded. In other embodiments, the housing part 26 and/or the cover 26 are made of a metallic material.

Figure 4:
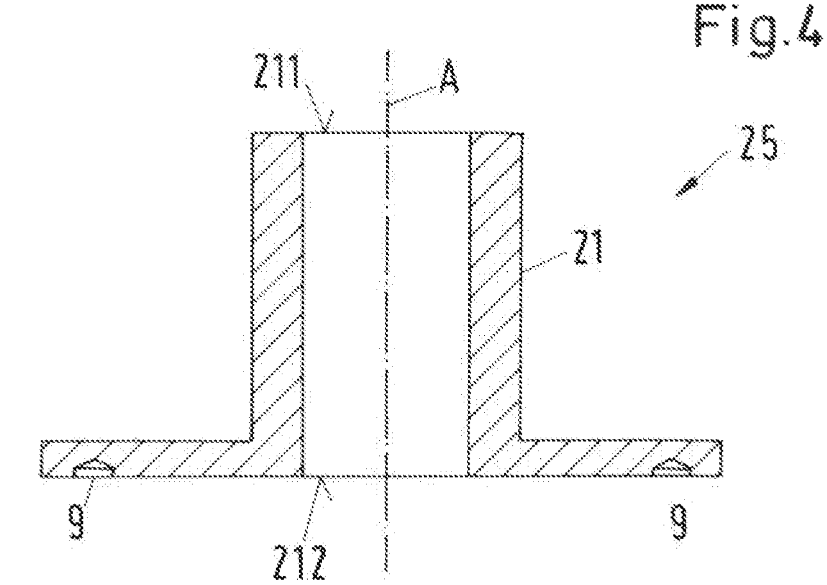
FIG. 4 is a sectional view of the cover of the first embodiment from FIG. 2.
Figure 5:
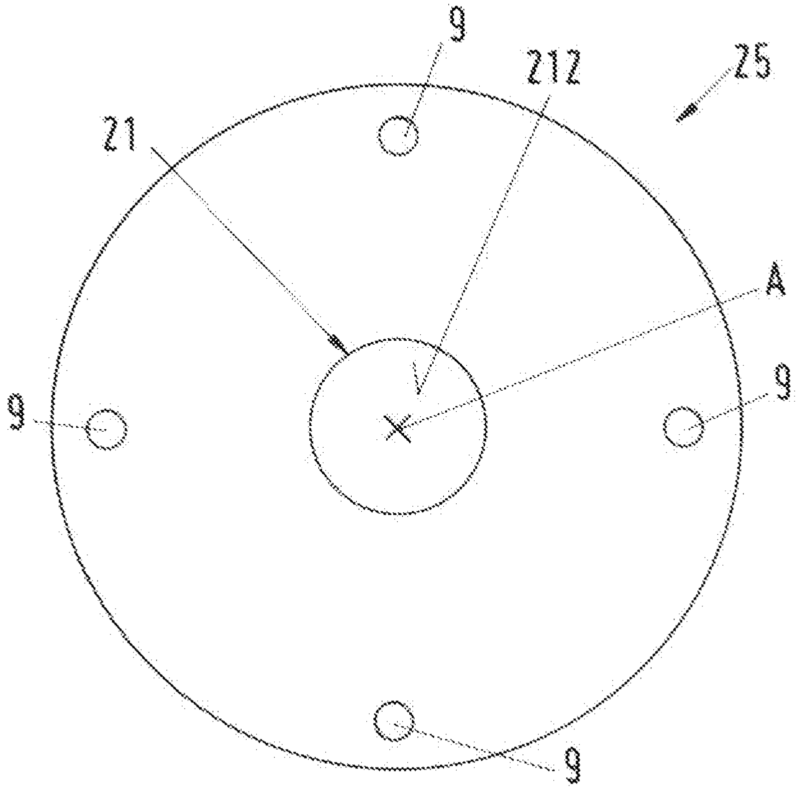
FIG. 5 is a plan view on the cover from FIG. 4 seen from the bottom of the pump housing.
Figure 6:
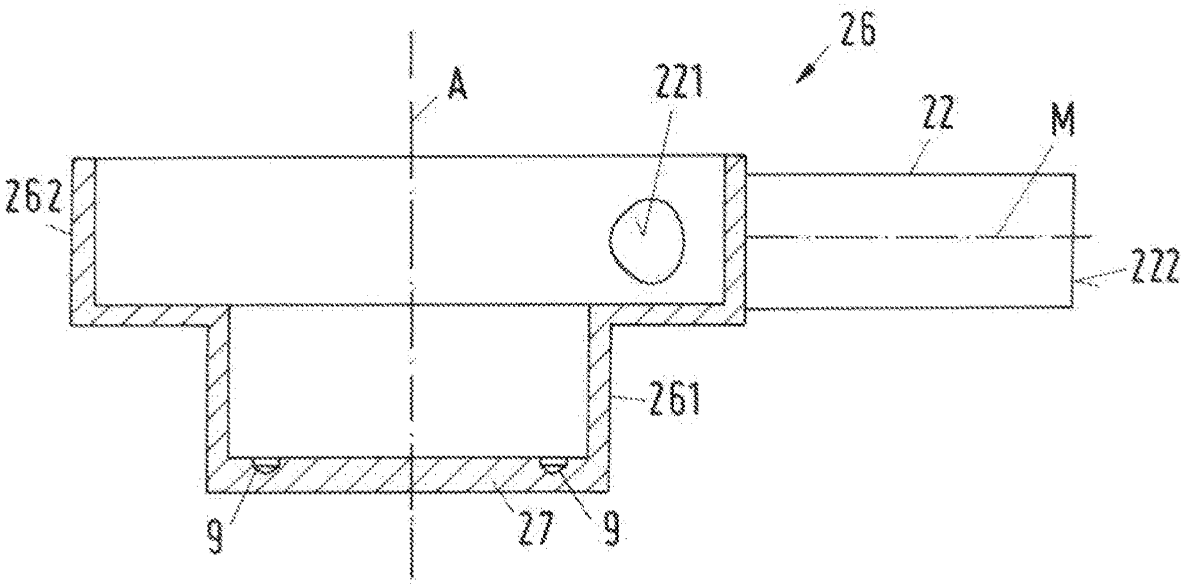
FIG. 6 is a sectional view of the housing part of the first embodiment from FIG. 2.
Figure 7:
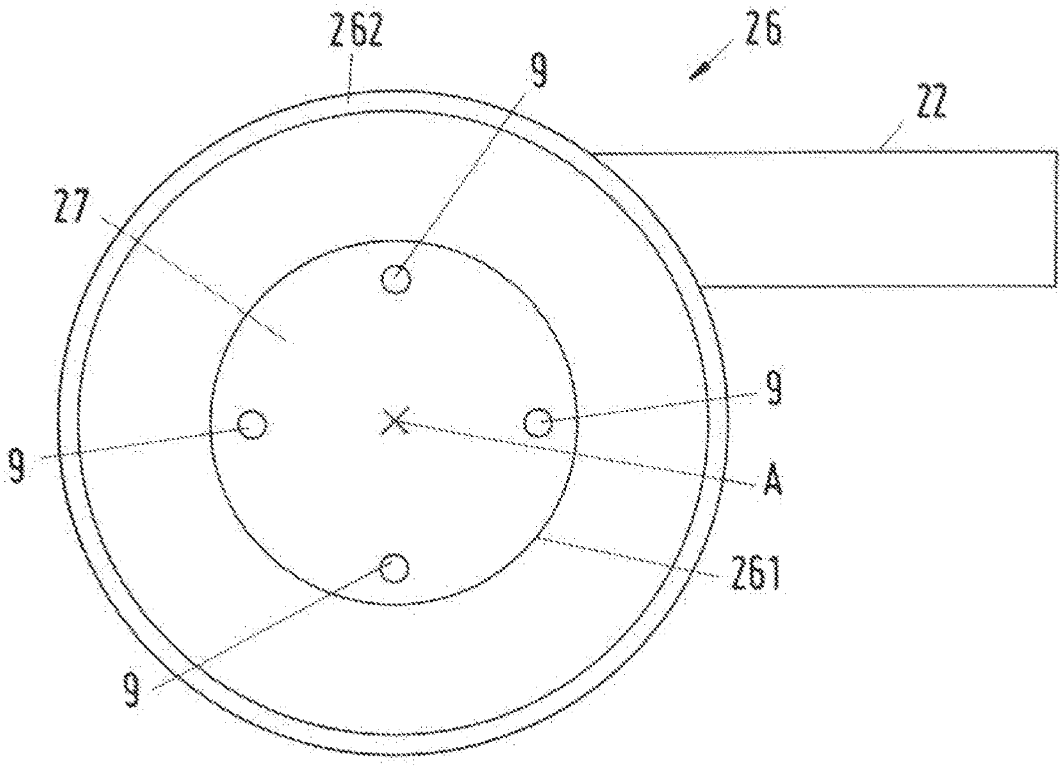
FIG. 7 is a plan view on the housing part from FIG. 6 seen from the cover of the pump housing.

For a better understanding, FIG. 4 shows a sectional view of the cover 25 in a section in the axial direction A, and FIG. 5 a plan view on the cover 25 seen from the housing part 26. Furthermore, FIG. 6 shows a sectional view of the housing part 26 in a section in the axial direction, and FIG. 7 shows a plan view on the housing part 26 seen from the cover 25.

The housing part 26 comprises a lower cylindrical portion 261 and an upper cylindrical portion 262 which are arranged coaxially and one behind the other with respect to the axial direction A, wherein the upper cylindrical portion 262 has a larger diameter than the lower cylindrical portion 261. The lower cylindrical portion 261 of the housing part 26 comprises a bottom 27, which forms the lower end of the pump housing 2 according to the representation, and which is arranged perpendicular to the axial direction A.

The cover 25 rests on the upper end, according to the representation, of the upper cylindrical portion 262 and is firmly connected to it. The inlet 21 for the fluid to be conveyed is disposed on the cover 25. The inlet 21 is designed as inlet connection, which is preferably manufactured in one piece with the cover 25. The inlet 21 designed as an inlet connection extends in the axial direction A, so that the fluid can flow into the pump housing 2 in the axial direction. The inlet connection 21 preferably has an inlet surface 211, through which the fluid enters the inlet connection 21, and an outlet surface 212, through which the fluid leaves the inlet connection 21 and flows to the impeller 32. Preferably, the inlet surface 211 is larger than or equal to the outlet surface 212. The outlet 22 for the fluid to be conveyed is provided on the upper cylindrical portion 262. Here, the outlet 22 is designed as an outlet connection 22, which is preferably manufactured in one piece with the housing part 26. The outlet 22 designed as an outlet connection extends parallel to the radial plane, i.e. perpendicular to the inlet 21, so that the fluid flows out of the pump housing 2 in a radial direction. The outlet connection 22 has an inlet surface 221, through which the fluid enters the outlet connection 22, and an outlet surface 222, through which the fluid leaves the outlet connection 22. Preferably, the inlet surface 221 is smaller than the outlet surface 222, as also represented in FIG. 2. The outlet connection 22 is preferably designed cylindrically with regard to its outer shape. In order that the inlet surface 221 of the outlet connection is nevertheless smaller than the outlet surface 222 of the outlet connection 21, a tapering area can be provided in the wall of the outlet connection 22 where the thickness of the wall changes so that the inner diameter of the outlet connection 22 changes. Due to this, the flow cross-section for the fluid also changes, which means the surface perpendicular to the central axis M of the outlet connection 22 through which the fluid flows. Such an embodiment is shown in more detail in FIG. 8, for example.

For the cylindrical design of the outlet connection 22 it is preferred that the outlet connection 22 is arranged with respect to the axial direction A in such a way that the central axis M of the outlet connection 22 is closer to the magnetically effective core 31 of the rotor 3 than to the cover 25 of the pump housing 2. This means that the outlet connection 22 is not arranged centrally in the upper cylindrical portion 262 of the housing part 26 with respect to the axial direction A but is displaced in direction of the bottom 27—i.e. downwards according to the representation.

The rotor 3, which comprises the magnetically effective core 31, the jacket 35 and the impeller 32, is arranged in the pump housing 2 between the bottom 27 and the cover 25 of the pump housing 2, wherein the magnetically effective core 31 with the optional jacket 35 is arranged below the impeller 32 according to the representation. The magnetically effective core 31 including the jacket 35 is preferably designed cylindrically.

The pump housing 2 is inserted into the stator 4—as can also be seen in FIG. 1—so that the upper cylindrical portion 262 rests on the stator 4 and the lower cylindrical portion 261 of the pump housing 2 is arranged in the stator 4, more precisely between the stator poles 46. The pump housing 2 can be fixed to the stator 4, for example by screws (not shown).

The rotor 3 is designed and arranged in such a way that in the operating state the magnetically effective core 31 of the rotor 3 is surrounded by the stator poles 46 and can be centered in the radial plane between the stator poles 46 by the electromagnetic fields generated by the windings 6 and can be driven to rotate about the axial direction A. If the rotor 3 is centered and not deflected with respect to the axial direction A, the magnetically effective core 31 is located centrally between the stator poles 46.

The rotor 3 has an outer diameter D, which is the diameter D of the magnetically effective core 31 including the jacket 35. If the jacket 35 is provided, the outer diameter D of the rotor 3 is larger than the diameter d (FIG. 1) of the magnetically effective core 31 of the rotor 3.

The impeller 32 is preferably designed as a radial impeller 32 so that the vanes 33 deflect the fluid flowing in the axial direction A through the inlet 21 in a radial direction and convey it to the outlet 22.

According to the invention, at least one indentation is disposed in the bottom 27 and/or in the cover 25, which indentation is designed to generate a local turbulence. In the embodiment described here, a total of eight indentations 9 are provided, four of which are arranged in the cover 25 and four in the bottom 27.

In other embodiments, indentations 9 can also be disposed only in the cover or only in the bottom. The number of indentations 9 is also to be understood as an example. There can be only one indentation, or two or three indentations, or more than eight or significantly more than eight indentations, for example more than fifty. In principle, there is no upper limit to the number of indentations 9. The number and arrangement of the indentations can be adapted to the respective application, so that the desired reduction of the forces acting on the rotor 3, in particular the hydrodynamic forces, is achieved.

The indentation 9 or the indentations 9 represent a geometrical influence on the flow conditions inside the pump housing 2 whose purpose is to reduce the forces acting on the impeller 32 or on the rotor 3, respectively, in particular the forces acting in the axial direction A, as well as the moments which try to tilt the rotor 3 against the radial plane. Thus, the indentations 9 improve the stabilization of the rotor 3 with respect to all those degrees of freedom—here three—with respect to which the rotor is passively magnetically levitated or stabilized. The indentations 9 arranged in the bottom 27 or in the cover 25 thus change the flow behavior in such a way that the position of the rotor 3 can be set with less effort and travel.

The reduction of the forces, in particular the hydrodynamic forces, is based on the flow turbulence or the creation of turbulences caused by the indentations 9, which represent a local change of shape of the pump housing 2.

The embodiment according to the invention with the at least one indentation 9 can thus in principle take place without geometric barriers to reduce flow velocities, and without pressure-compensating bores through the rotor, as well as without narrow, wedge-shaped fluid gaps which, as for example in classical hydrodynamic bearings, cause a local increase in pressure. Rather, the indentations 9 lead to local turbulences and flow separation, which reduce the force effects of laminar or turbulent flow on the surfaces of the rotor 3 exposed to the flow. These turbulences or flow separations reduce the dynamic lift acting on the rotor 3 and thus the forces acting on the rotor 3.

Naturally, embodiments of the invention are also possible in which, for example, pressure-equalizing bores are additionally provided through the rotor 3. Such an embodiment is explained further on with reference to the second embodiment.

Each indentation 9 can be designed as a dimple, depression, countersink, bore or similar to locally swirl the flow. For example, the indentations 9 can be spherical or cylindrical. They can have a square or rectangular profile. The indentations can also be designed pyramid-shaped, cone-shaped, truncated cone-shaped, annular or with a free-form geometry. For manufacturing reasons, however, such geometries are preferred for the indentations 9 that can be generated with drilling or milling tools. For this reason, those designs of the indentation 9 are preferred in which each indentation 9 has a circular profile perpendicular to the axial direction A, i.e. is designed spherically or cylindrically.

Figure 3:
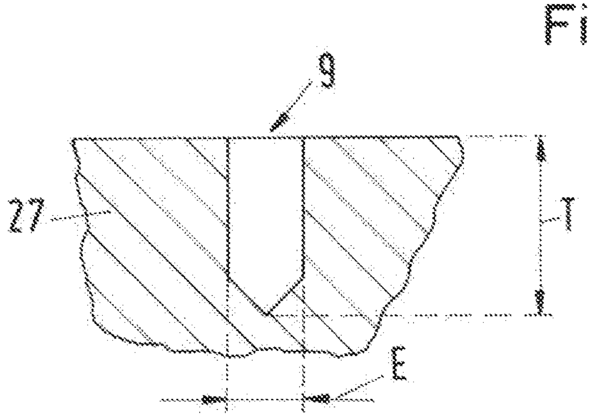
FIG. 3 is an enlarged sectional view of an indentation.

In FIG. 3, one of the indentations 9 is represented in a sectional view with an exemplary nature, which in this case is designed as a blind hole in the bottom 27 of the pump housing 2.

Usually, each indentation 9 has an extension E in the radial direction, which means the maximum width of the indentation 9 with respect to the radial direction, and a depth T, which means the maximum extension of the indentation with respect to the axial direction A.

In the case of the design as a blind hole shown in FIG. 3, the extension E is the diameter E of the hole in the radial direction, and the depth T is the length of the hole in the axial direction A.

In practice, it has proven to be advantageous if for each indentation 9 the respective extension E in the radial direction is at least one fiftieth of the outer diameter D of the rotor 3, i.e. E is greater than or equal to 0.02 D. It is also advantageous if for each indentation 9 the respective extension E in the radial direction is at most half of the outer diameter D of the rotor 3, i.e. E is smaller or equal to 0.5 D.

With respect to the axial direction A, it has proven to be advantageous if for each indentation 9 the respective depth T in the axial direction A is at least one hundred and fiftieth of the outer diameter D of the rotor 3, i.e. is greater than or equal to 0.015 D. It is particularly preferred if the respective depth T in the axial direction A is at least one hundredth of the outer diameter D of the rotor 3, i.e. if T is greater than or equal to 0.01 D.

Furthermore, with respect to the axial direction A, it is preferred if for each indentation 9 the respective depth T in the axial direction A is at most one tenth of the outer diameter D of the rotor 3, i.e. T is smaller than or equal to 0.1 D.

With respect to the position of the indentation 9 or the indentations 9, it is preferred that the indentation 9 or the indentations 9 is/are arranged in a radially outer edge area of the bottom 27 and/or the cover 25. As represented in FIG. 2, 4, 5, 6, this means in particular, that the indentation(s) 9 in the cover 25 of the pump housing 2 is/are located closer to the radially outer edge of the cover 25 than to the center of the cover 25, and that the indentation(s) 9 in the circular bottom 27 of the pump housing 2 is/are located closer to the radially outer edge of the bottom 27 than to the center of the bottom 27.

In preferred embodiments of the invention, the pump housing 2 and/or the impeller 32 and/or the jacket 35 of the rotor 3 are made of a plastic. Preferably, the pump housing 2 and the impeller 32 and the jacket 35 of the rotor 3 are made of a plastic. The pump housing 2 and the impeller 3 and the jacket 35 can all be made of the same plastic or at least two different plastics.

The selection of suitable plastics naturally depends on the respective application. Suitable plastics are, for example: polyethylenes (PE), polypropylenes (PP), low density polyethylenes (LDPE), ultra-low density polyethylenes (ULDPE), ethylene vinyl acetates (EVA), polyethylene terephthalates (PET), polyvinylchloride (PVC), polyvinylidene fluorides (PVDF), acrylonitrile buta diene styrenes (ABS), polyacrylics, polycarbonates.

In other likewise preferred embodiments of the invention, the pump housing 2 and/or the impeller 32 and/or the jacket 35 of the rotor 3 are made of one metallic material or of several different metallic materials. Examples of preferred metallic materials are titanium or stainless steels.

Figure 8:
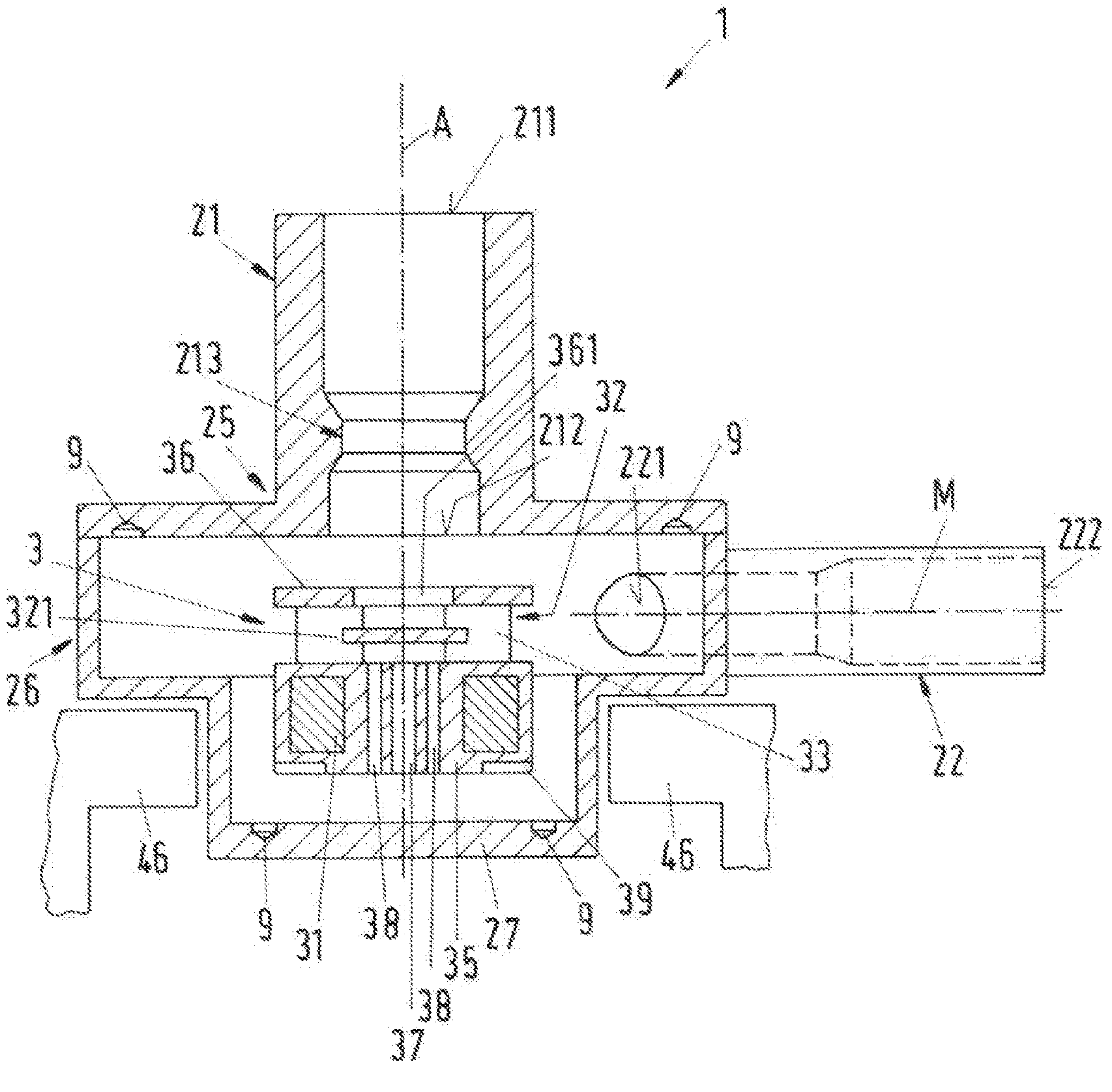
FIG. 8 is a schematic sectional view of a second embodiment of a centrifugal pump according to the invention.

FIG. 8 shows in a schematic sectional view a second embodiment of a centrifugal pump 1 according to the invention. For a better understanding, FIG. 9 still shows a plan view on the rotor of the second embodiment, seen from the bottom of the pump housing. Furthermore, the section line VIII-VIII, along which the section shown in FIG. 8 was made, is shown in FIG. 9.

In the following, only the differences to the first embodiment described above will be discussed. In particular, the reference signs have the same meaning as already explained in connection with the first embodiment. It is understood that all previous explanations apply in the same way or in the analogously same way to the second embodiment.

In the second embodiment, further measures are still realized, which, depending on the application, can further improve the stabilization of the rotor 3 with respect to the axial direction A and with respect to tilts against the radial plane, i.e. with respect to the three passively magnetically stabilized degrees of freedom. It is understood that all these measures can all be realized, but not all of them need to be realized. This means that such embodiments are also possible in which, for example, one or more of the measures described with reference to the second embodiment are combined with the first embodiment.

Figure 9:
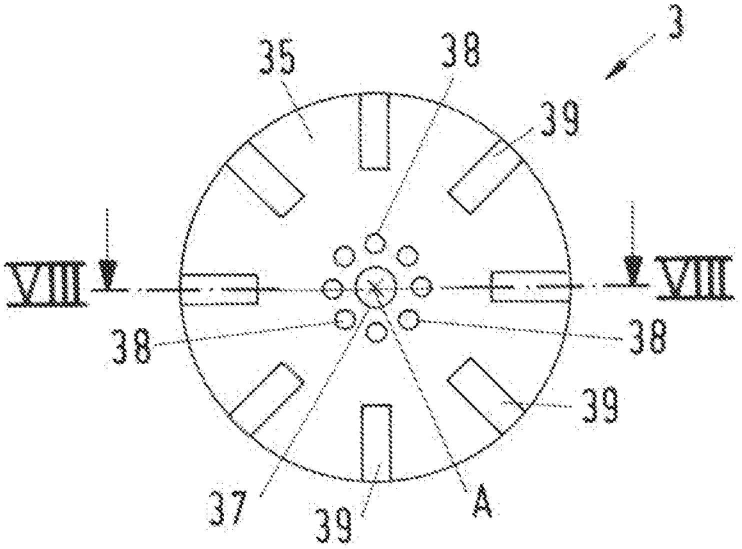
FIG. 9 is a plan view on the rotor of the second embodiment seen from the bottom of the pump housing.

In the second embodiment of the centrifugal pump 1 according to the invention represented in FIG. 8 and FIG. 9, the inlet 21 of the pump housing 2 designed as an inlet connection has a constriction area 213 in which the flow cross-section perpendicular to the axial direction A is smaller than the inlet surface 211 and smaller than the outlet surface 212 of the inlet connection 21. In addition, the inlet surface 211 of the inlet connection 21 is larger than its outlet surface 212. Comparing the respective surfaces, the inlet surface 211 is larger than the outlet surface 212, and the outlet surface 212 is larger than the flow cross-section in the constriction area 213.

The outlet 22 of the pump housing 2 is designed in the analogously same way as explained for the first embodiment, i.e. in such a way that the inlet surface 221 of the outlet connection 22 is smaller than the outlet surface 222 of the outlet connection 22, and that the outlet connection 22 is arranged with respect to the axial direction A in such a way that the central axis M is closer to the annular magnetically effective core 31 of the rotor 3 than to the cover 25 of the pump housing 2. With reference to the dotted lines in the outlet 22, it is represented in FIG. 8 how the inside of the outlet connection 22 is designed, so that the outlet surface 222 of the outlet connection 22 is larger than the inlet surface 221 of the outlet connection 21.

The size of the outlet surface 222 of the outlet connection 22 and the size of the inlet surface 211 of the inlet connection 21, including the respective surrounding wall, are usually predefined by standards. The outer diameter of both the inlet connection 21 at the inlet surface 211 and the outer diameter of the outlet connection 22 at the outlet surface 222 is dimensioned such that the centrifugal pump 1 can be connected to normal pipes or tubes in a flow system.

Furthermore, the rotor 3 has a cover plate 36 which is designed like an annular disk and which covers the vanes 33 of the impeller 32 at their edge facing the inlet 21 or the cover 25, wherein a centrally arranged opening 361 is provided in the cover plate 36 through which the fluid can flow to the impeller 32.

Optionally, the magnetically effective core 31 of the rotor 3 can have a central bore 37 which extends in the axial direction A completely through the magnetically effective core 31 and the optional jacket 35.

Alternatively, or in addition, the rotor 3 can comprise a balancing hole 38 or a plurality of balancing holes 38, wherein each balancing hole 38 extents in the axial direction A completely through the magnetically effective core 31 of the rotor 3 and the optional jacket 35. Each balancing hole 38 preferably is arranged decentral, i.e. not in the center of the rotor 3.

In the second embodiment, a plurality of balancing holes 38 is provided, namely eight balancing holes 38.

The balancing holes 38 are preferably arranged on a circular line, wherein the center of the circle is located in the center of the rotor 3. This means, if the central bore 37 is disposed in the rotor 3, the balancing holes 38 are arranged in a circle around the central bore 37. Preferably, at most or exactly eight balancing holes 38 are provided, which are preferably arranged equidistantly around the central bore 37 of the rotor 3 or around the center of the rotor 3.

Each balancing hole 38 has a diameter in each case, which is smaller than the diameter of the central bore 37.

A plurality of rear vanes 39 is provided on the axial end face of the rotor 3 facing away from the cover 25 and facing the bottom 27. In the operating state, these rear vanes 39 are opposite the bottom 27 of the pump housing 2. In the second embodiment, a total of eight rear vanes 39 is provided.

The rear vanes 39 can be realized, for example, by providing recesses in the jacket 35 of the rotor 3, so that the rear vanes 39 are each formed between two adjacent recesses.

Furthermore, it is of course also possible to design the rear vanes 39 as elevations. For this purpose, for example, a structure similar to an impeller can be generated, which is then attached to the axial end face of the rotor 3, so that the rear vanes 39 are opposite the bottom 27 of the pump housing 2. Of course, the rear vanes 38 can also be manufactured individually and then be attached to the axial end face of the rotor 3.

Preferably, each rear vane 39 starts at the radial outer edge of the axial end face of the rotor 3 and extends from there radially inwards. Each rear vane 39 can extend to the center of the axial end face or to the central bore 37, or each rear vane 39, as shown in FIG. 9, has a length in the radial direction which is smaller than the radius of the axial end face, e.g. half as large. In other embodiments, the rear vanes 39 can also be designed in a curved manner.

In the second embodiment, an annular or circular disk-shaped pressure plate 321 is disposed on the impeller 32, which is aligned perpendicular to axial direction A. The pressure plate 321 is arranged, with respect to the axial direction A, between the magnetically effective core and the end of the impeller 32 facing the cover 25 of the pump housing 2, for example halfway up the vanes 33 of the impeller 32. The pressure plate 321 extends between the vanes of the impeller 32. If the rotor 3 has a cover plate 36, the pressure plate 321 is arranged, with respect to the axial direction A, between the magnetically effective core 31 and the cover plate 36 and parallel to the cover plate 36. The pressure plate 321 extends between all vanes 33. With respect to the radial direction, the pressure plate 321 is arranged centered with respect to the rotor 3 and extends in the radial direction at least so far that it covers all balancing holes 38 at an axial distance. In the embodiment represented in FIG. 8, the diameter of the pressure plate 321 is significantly smaller than the diameter of the impeller 32, which is measured at the vanes 33.

Figure 10:
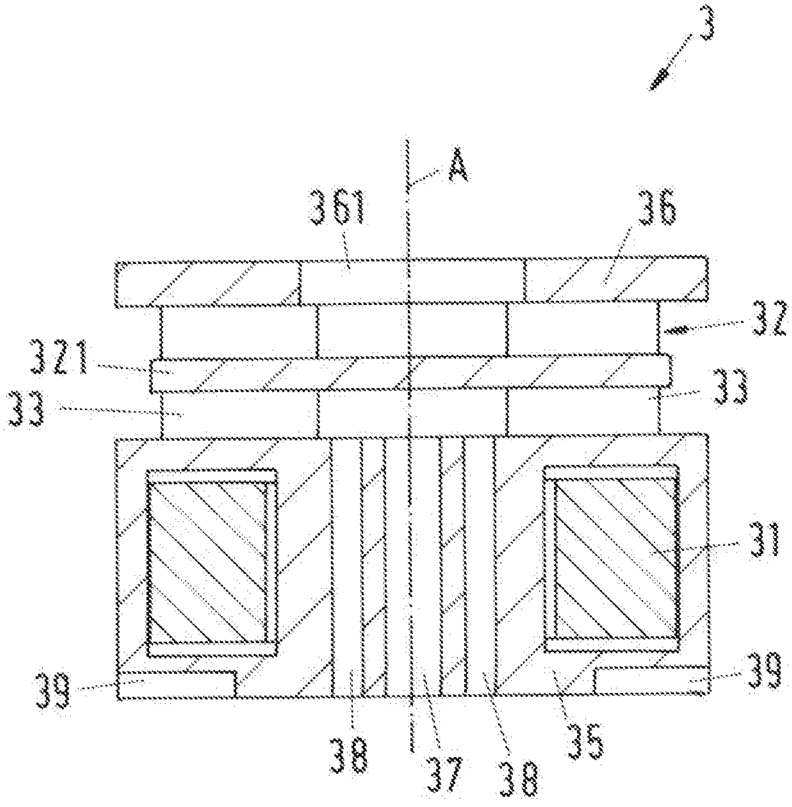
FIG. 10 is a schematic sectional view for a variant of the rotor.

FIG. 10 shows in a schematic sectional view a variant for the rotor 3, which differs from the rotor 3 represented in FIG. 8 in that the pressure plate 321 has a larger diameter. In the variant shown in FIG. 10, the pressure plate 321 extends in the radial direction approximately to the radially outer end of the vanes 33 of the impeller 32.

What is claimed:

1. A centrifugal pump for conveying a fluid, comprising:
- a pump housing;
- a rotor configured to convey the fluid disposed within the housing; and
- a stator which, together with the rotor, forms an electromagnetic rotary drive configured to rotate the rotor about an axial direction,
- the stator being a bearing and drive stator with which the rotor is capable of being magnetically driven without contact and magnetically levitated without contact with respect to the stator,
- the rotor being passively magnetically levitated in the axial direction, and actively magnetically levitated in a radial plane perpendicular to the axial direction,
- the pump housing comprising a bottom and a cover, and the rotor being arranged in the pump housing between the bottom and the cover with respect to the axial direction, a plurality of indentations disposed in the bottom or in the cover and each of the plurality of indentations is located closer to in a radially outer edge region of the pump housing than to a center of the housing, the plurality of indentations being configured to generate a local turbulence and cause a geometrical influence on the flow conditions inside the pump housing to reduce the forces acting on the impeller.

2. The centrifugal pump according to claim 1, wherein the rotor comprises an annular or disk-shaped magnetically effective core, and an impeller having a plurality of vanes configured to convey the fluid.

3. The centrifugal pump according to claim 1, wherein the cover includes an inlet for the fluid configured such that the fluid is capable of flowing into the pump housing in the axial direction, and the pump housing comprises an outlet for the fluid configured such that the fluid is capable of flowing out of the pump housing in a radial direction.

4. The centrifugal pump according to claim 2, wherein the stator has a plurality of stator poles arranged annularly, and the pump housing with the rotor arranged therein is configured so as to be inserted into the stator between the stator poles in such a way that the magnetically effective core of the rotor is surrounded by the stator poles.

5. The centrifugal pump according to claim 1, wherein the rotor has an outer diameter, and each of the plurality of indentations has an extension with respect to a radial direction which is at least one fiftieth of the outer diameter of the rotor.

6. The centrifugal pump according to claim 1, wherein the rotor has an outer diameter, and each of the plurality of indentations has an extension with respect to the radial direction which is at most half the outer diameter of the rotor.

7. The centrifugal pump according to claim 1, wherein the rotor has an outer diameter, and each of the plurality of indentations has a depth with respect to the axial direction which is at least one hundred fiftieth of the outer diameter of the rotor.

8. The centrifugal pump according to claim 1, wherein the rotor has an outer diameter, and each of the plurality of indentations has a depth with respect to the axial direction which is at most one tenth of the outer diameter of the rotor.

9. The centrifugal pump according to claim 1, wherein each of the plurality of indentations has a circular profile perpendicular to the axial direction.

10. The centrifugal pump according to claim 1, wherein the plurality of indentations includes a first indentation in the cover and a second indentation in the bottom of the pump housing.

11. The centrifugal pump according to claim 1, wherein the pump housing is plastic.

12. The centrifugal pump according to claim 2, wherein the impeller is plastic.

13. The centrifugal pump according to claim 2, wherein the rotor has a jacket which completely encloses the magnetically effective core of the rotor, and which is a plastic.

14. A pump housing, comprising:
- a bottom; and
- a cover, the bottom and the cover configured to receive a rotor and impeller for conveying a fluid therebetween with respect to an axial direction, and plurality of indentations disposed in the bottom or in the cover and each of the plurality of indentations is located closer to in a radially outer edge region of the pump housing than to a center of the housing, the plurality of indentations being configured to generate a local turbulence and cause a geometrical influence on the flow conditions inside the pump housing to reduce the forces acting on the impeller, the pump housing configured to operate with components of a centrifugal pump including
- the rotor,
- the impeller, and
- a stator which, together with the rotor, forms an electromagnetic rotary drive configured to rotate the rotor about the axial direction,
- the stator being a bearing and drive stator with which the rotor is capable of being magnetically driven without contact and magnetically levitated without contact with respect to the stator, and
- the rotor being passively magnetically levitated in the axial direction, and actively magnetically levitated in a radial plane perpendicular to the axial direction.

15. The centrifugal pump according to claim 1, wherein the rotor has an outer diameter, and each of the plurality of indentations has a depth with respect to the axial direction which is at least one hundredth of the outer diameter of the rotor.

* * * * *